(12) United States Patent
Kim

(10) Patent No.: US 7,480,007 B2
(45) Date of Patent: Jan. 20, 2009

(54) DISPLAY SYSTEM AND METHOD OF CONVERTING SYNC SIGNAL THEREOF

(75) Inventor: Hyun-woo Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 554 days.

(21) Appl. No.: 10/837,717

(22) Filed: May 4, 2004

(65) Prior Publication Data
US 2005/0081255 A1   Apr. 14, 2005

(30) Foreign Application Priority Data
Sep. 22, 2003   (KR)   ............... 10-2003-0065477

(51) Int. Cl.
*H04N 7/01* (2006.01)
*H04N 11/20* (2006.01)

(52) U.S. Cl. ............. 348/441; 348/458; 348/540; 348/521

(58) Field of Classification Search ......... 348/441, 348/445–446, 554–558, 725, 706, 565, 458, 348/521, 540, 547; 725/147; *H04N 7/01*, *H04N 11/20*
See application file for complete search history.

(56) References Cited
U.S. PATENT DOCUMENTS

| | | | | |
|---|---|---|---|---|
| 5,812,210 A | * | 9/1998 | Arai et al. | 348/555 |
| 6,097,437 A | * | 8/2000 | Hwang | 348/441 |
| 6,175,387 B1 | * | 1/2001 | Han | 348/565 |
| 6,377,251 B1 | * | 4/2002 | Takasu et al. | 345/204 |
| 6,704,056 B2 | * | 3/2004 | Kitahara et al. | 348/458 |

* cited by examiner

Primary Examiner—Trang U Tran
(74) Attorney, Agent, or Firm—Sughrue Mion, PLLC

(57) ABSTRACT

A display system comprising a video signal supplier supplying a video signal with a first video signal standard comprising a predetermined sync signal and a data range; a display apparatus supporting one of the first video signal standard and a second video signal standard comprising a sync signal and a data range which are at least being partially different to the first video signal standard and a data range being equal to the first video signal standard and outputting the video signal from the video signal supplier; a selector selecting the display apparatus supporting one of the first video signal standard and the second video signal standard; and a sync signal converter receiving a sync signal in the video signal from the video signal supplier according to a selection of the selector and converts the received sync signal into either the first video signal standard or the second video signal standard, which the selected display apparatus supports, to output the selected display apparatus. With this configuration, the present invention provides a display system which can alternatively select a video signal of one of a first video signal standard and a second video signal standard, which have a different sync signal standard, to output according to a selection of a user and a method of converting a sync signal thereof.

22 Claims, 4 Drawing Sheets

DISPLAY SYSTEM AND METHOD OF CONVERTING SYNC SIGNAL THEREOF

CROSS-REFERENCE TO RELATED APPLICATIONS

This application is based on and claims priority from Korean Patent Application No. 2003-65477, filed 22 Sep. 2003, in the Korean Intellectual Property Office, the disclosure of which is incorporated herein by reference.

BACKGROUND OF THE INVENTION

1. Field of the Invention

The present invention relates to a display system and a method of converting a sync signal thereof, and more particularly, to a display system which can alternatively select a video signal of one of a first video signal standard and a second video signal standard, which have different sync signal standards, to output according to a selection of a user and a method of converting a sync signal thereof.

2. Description of the Related Art

Recently, a digital set top box has been increasingly used for connecting the Internet and for watching a digital television. In particular, the digital set top box is connected to a display apparatus such as television, a computer monitor, etc. and thus provides a user with convenient services by transmitting/receiving signals through an external satellite broadcasting or an Internet connection.

The set top box, as shown in FIG. 1, comprises a tuner 114 receiving an encoded broadcasting signal through an antenna 112; a signal processor 116 processing the broadcasting signal input from the tuner 114; and an analog RGB output part 118 and a Digital Video Interface (DVI) output part 120, which output the broadcasting signal processed in the signal processor 116 to a display apparatus (not shown).

Herein, the signal processor 116 decodes the encoded broadcasting signal, converts the decoded broadcasting signal into an analog RGB data, and outputs the analog RGB data to the analog RGB output part 118, or outputs a decoded broadcasting signal to the DVI output part 120.

A schematic description of a displaying process of a broadcasting signal using the conventional set top box 200 is as follows.

The broadcasting signal received through the antenna 112 is processed using a channel tuning process by the tuner 114 to select a desired station. The broadcasting signal input by the tuner 114 is processed by the signal processor 116 and then is output by the output parts 118 and 120 after being properly formatted for the analog RGB or the DVI.

In the conventional set top box 200, an output signal standard including the analog RGB output and the DVI output of the signal processor 116 complies with either the Video Electrics Standards Association (VESA) standard or the EIA/CEA 861B standard.

As a display apparatus connected to the set top box 200, a monitor supports the VESA standard and a television supports the EIA/CEA 861B standard, in general.

Therefore, an output video signal of the set top box 200 is set to output only for the monitor supporting the VESA standard or for the television supporting the EIA/CEA 861B standard.

In other words, if the display apparatus connected to the conventional set top box does not correspond to the video signal format output from the set top box, an image shown on the display apparatus becomes shifted or fuzzy.

SUMMARY OF THE INVENTION

Accordingly, it is an aspect of the present invention to provide a display system which can alternatively select a video signal of one of a first video signal standard and a second video signal standard, which have different sync signal standards, to output according to a selection of a user and a method of converting a sync signal thereof.

The foregoing and/or other aspects of the present invention are also achieved by providing a display system comprising a video signal supplier supplying a video signal with a first video signal standard comprising a predetermined sync signal and a data range; a display apparatus supporting one of the first video signal standard and a second video signal standard comprising a sync signal and a data range which are at least being partially different to the first video signal standard and a data range being equal to the first video signal standard and outputting the video signal from the video signal supplier; a selector selecting the display apparatus supporting one of the first video signal standard and the second video signal standard; and a sync signal converter receiving a sync signal in the video signal from the video signal supplier according to a selection of the selector and converts the received sync signal into either the first video signal standard or the second video signal standard, which the selected display apparatus supports, to output the selected display apparatus.

According to an aspect of the present invention, the sync signal of the first video signal standard and the second video signal standard are different in at least one of polarity of V (Vertical) sync signal and H (Horizontal) sync signal; the number of V sync signal line; the number of front porch line and back porch line of V sync signal; and the number of front porch pixel and back porch pixel of H sync signal.

According to an aspect of the present invention, the first video signal standard can be one of VESA standard and EIA/CEA 861B standard, and the second video signal standard can be the other one.

According to another aspect of the present invention, the forgoing and other aspects may be also achieved by providing a method of converting a sync signal of a display system comprising a video signal supplier supplying a video signal with a first video signal standard comprising a predetermined sync signal and a data range, and a display apparatus supporting one of the first video signal standard and a second video signal standard comprising a sync signal and a data range which are at least being partially different to the first video signal standard and a data range being equal to the first video signal standard and outputting the video signal from the video signal supplier, the method comprising selecting the display apparatus supporting one of the first video signal standard and the second video signal standard; and receiving a sync signal in the video signal from the video signal supplier according to a selection of the display apparatus and converting the sync signal into either the first video signal standard or the second video signal standard, which the selected display apparatus supports, to output the selected display apparatus.

According to an aspect of the present invention, the first video signal standard and the second video signal standard are different in at least one of polarity of a V sync signal and a H sync signal; the number of V sync signal lines; the number of front porch lines and back porch lines of the V sync signal; and the number of front porch pixels and back porch pixels of the H sync signal.

According to an aspect of the present invention, the first video signal standard can be one of VESA standard and EIA/CEA 861B standard, and the second video signal standard can be the other one.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENT

Figure 1:
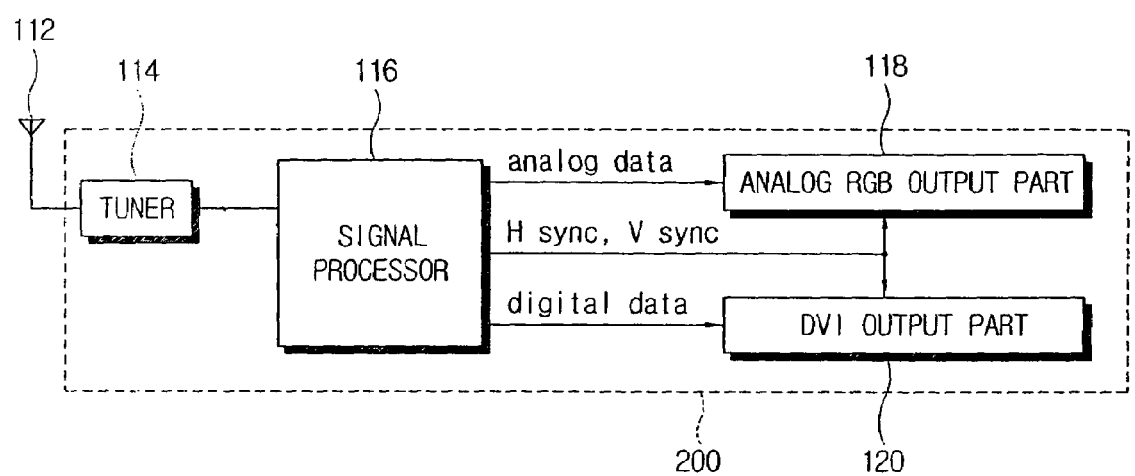
FIG. 1 is a block diagram of a conventional display system.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
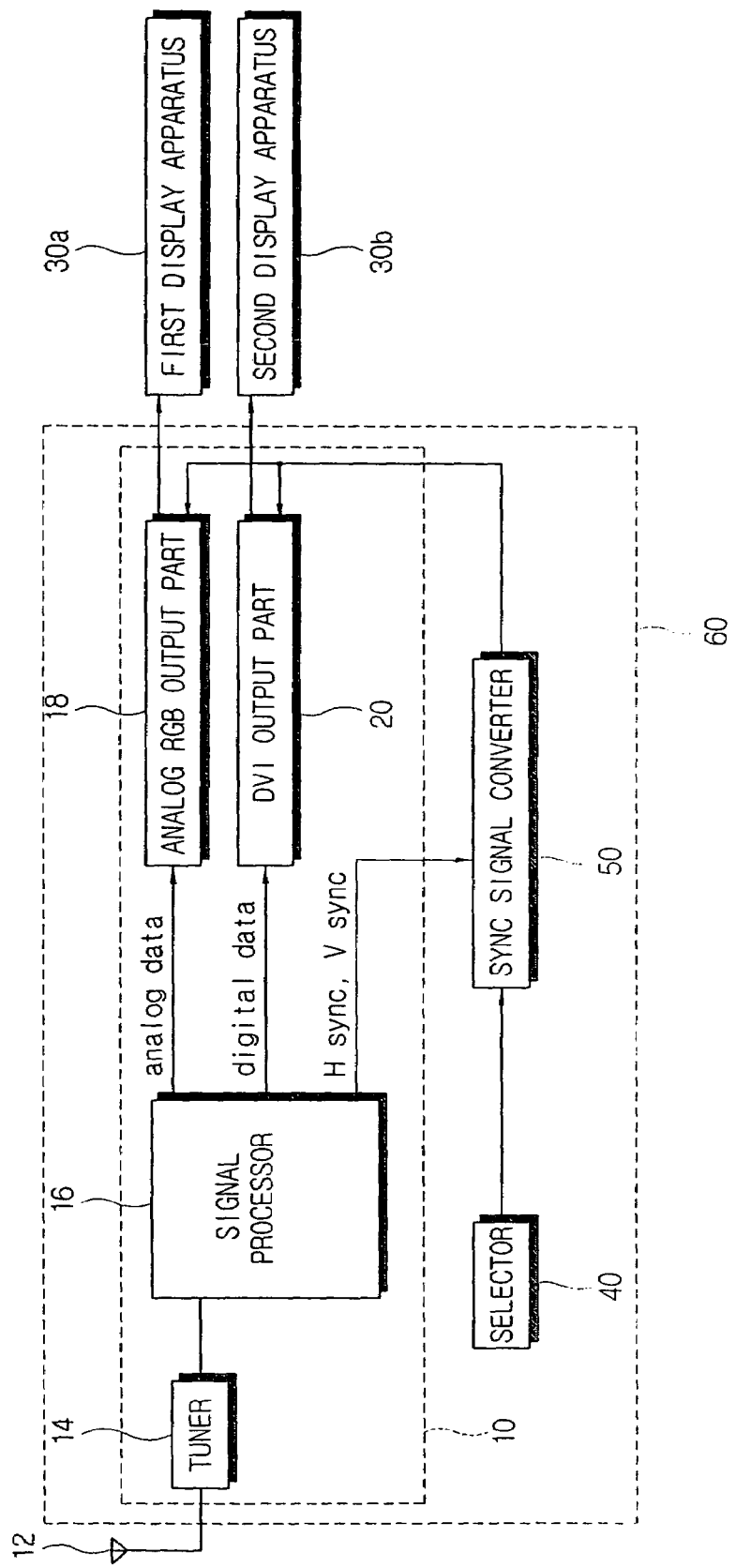
FIG. 2 is a block diagram of a display system according to an embodiment of the present invention.

FIG. 2 is a block diagram of a display system according to an embodiment of the present invention. As shown therein, the display system comprises a video signal supplier 10 supplying a video signal in the EIA/CEA 861B standard with a predetermined sync signal and a video data range; a first display apparatus 30a and a second display apparatus 30b displaying the video signal supplied from the video signal supplier 10, and supporting either the VESA standard or the EIA/CEA 861B standard; a selector 40 alternatively selecting one of the first display apparatus and the second display apparatus, which support either the VESA standard and the EIA/CEA 861B standard; and a sync signal converter 50 alternatively converting a sync signal supplied from the video signal supplier 10 into a sync signal of the VESA standard or of the EIA/CEA 861B standard to output.

The video signal supplier 10, the selector 40, and the sync signal converter 50 may be provided in a set top box 60, for example.

Similar to the conventional set top box, the video signal supplier 10 comprises a tuner 14 receiving an encoded broadcasting signal through an antenna 12; a signal processor 16 processing the broadcasting signal input from the tuner 14; and an analog RGB output part 18 and a DVI output part 20 alternatively outputting the broadcasting signal processed by the signal processor 16 to the first display apparatus 30a and the second display apparatus 30b.

Herein, the first display apparatus 30a and the second display apparatus 30b may generally comprise a monitor supporting the VESA standard or a television supporting the EIA/CEA 861B standard.

A video data signal in the video signal output from the signal processor 16 is directly transmitted to the analog RGB output part 18 and the DVI output part 20, and a V sync signal and a H sync signal are transmitted to the sync signal converter (to be described later) 50.

The selector 40 preferably comprises a key input part or a control switch provided in the set top box 60 to alternatively select the monitor supporting the VESA standard or the television supporting the EIA/CEA 861B standard.

The sync signal converter 50 converts a sync signal in the EIA/CEA 861B standard output from the signal processor 16 into a sync signal in the VESA standard according to a selection by a user.

The VESA standard and the EIA/CEA 861B standard are the same in a data range but differ in a sync signal standard. Thus, the video data signal is used as it is output from the signal processor 16 and the sync signal standard is to be converted by the sync signal converter 50.

If the selector 40 selects the television in the EIA/CEA standard, the sync signal converter 50 does not convert the sync signal in the EIA/CEA standard output from the signal processor 16 of the video signal supplier 10 and outputs the sync signal to the analog RGB output part 18 and the DVI output part 20.

If the selector 40 selects the monitor supporting the VESA standard, the sync signal converter 50 converts a sync signal in the EIA/CEA 861B standard into the VESA standard and outputs through the RGB output part 18 or the DVI output part 20.

Table 1 shows aspects of the sync signals in resolutions (480p, 720p,1080i) of the EIA/CEA 861B standard and the VESA standard respectively.

TABLE 1

| Parameter | Unit | VESA DTV | | | EIA/CEA 861B | | |
|---|---|---|---|---|---|---|---|
| | | 1920 59.94 Hz | 1280 59.94 Hz | 720 59.94 Hz | 1920 59.94 Hz | 1280 59.94 Hz | 720 59.94 Hz |
| H-Resolution | Pixels | 1920 | 1280 | 720 | 1920 | 1280 | 720 |
| V-Resolution | Lines | 540(1080i) | 720 | 480 | 540(1080i) | 720 | 480 |
| H Frequency | kHz | 33.716 | 44.955 | 31.469 | 33.716 | 44.955 | 31.469 |
| V Frequency | Hz | 59.994 | 59.940 | 59.940 | 59.994 | 59.940 | 59.940 |
| Scan Type | — | I | NI | NI | I | NI | NI |
| H Sync Polarity | — | N | N | N | P | P | N |
| V Sync Polarity | — | N | N | N | P | P | N |
| Pixel Frequency | MHz | 74.176 | 74.176 | 27.000 | 74.176 | 74.176 | 27.000 |
| Pixel Time | nsec | 13.500 | 13.500 | 37.000 | 13.500 | 13.500 | 37.000 |
| Line Time | usec | 29.700 | 22.200 | 31.800 | 29.700 | 22.200 | 31.800 |
| Frame Time | msec | 16.700 | 16.700 | 16.700 | 16.700 | 16.700 | 16.700 |
| H Addressable | Pixels | 1920 | 1280 | 720 | 1920 | 1280 | 720 |
| H Right Border | Pixels | 0 | 0 | 0 | 0 | 0 | 0 |
| H Front Porch | Pixels | 44 | 70 | 16 | 88 | 110 | 16 |
| H Sync | Pixels | 44 | 40 | 62 | 44 | 40 | 62 |
| H Back Porch | Pixels | 192 | 260 | 60 | 148 | 220 | 60 |
| H Left Border | Pixels | 0 | 0 | 0 | 0 | 0 | 0 |
| H Total | Pixels | 2200 | 1650 | 858 | 2200 | 1650 | 858 |

TABLE 1-continued

|  |  | VESA DTV | | | EIA/CEA 861B | | |
| --- | --- | --- | --- | --- | --- | --- | --- |
| Parameter | Unit | 1920 59.94 Hz | 1280 59.94 Hz | 720 59.94 Hz | 1920 59.94 Hz | 1280 59.94 Hz | 720 59.94 Hz |
| V Addressable | Lines | 540 | 720 | 480 | 540 | 720 | 480 |
| V Bottom Border | Lines | 0 | 0 | 0 | 0 | 0 | 0 |
| V FP(Odd Field) | Lines | 2 | 5 | 10 | 2 | 5 | 9 |
| V Sync | Lines | 5 | 5 | 2 | 5 | 5 | 6 |
| V BP(Odd Field) | Lines | 15 | 20 | 33 | 15 | 20 | 30 |
| V Top Border | Lines | 0 | 0 | 0 | 0 | 0 | 0 |
| V Total | Lines | 562 | 750 | 525 | 562 | 750 | 525 |
| sync Type |  | Sep. | Sep. | Sep. | Sep. | Sep. | Sep. |

According to Table 1, the EIA/CEA 861B standard and the VESA standard are different in polarity of the H (Horizontal) sync signal and the V (Vertical) sync signal, V total lines, front porch and back porch lines of V sync signal, front porch and back porch pixels of the H sync signal, etc.

Figure 3:
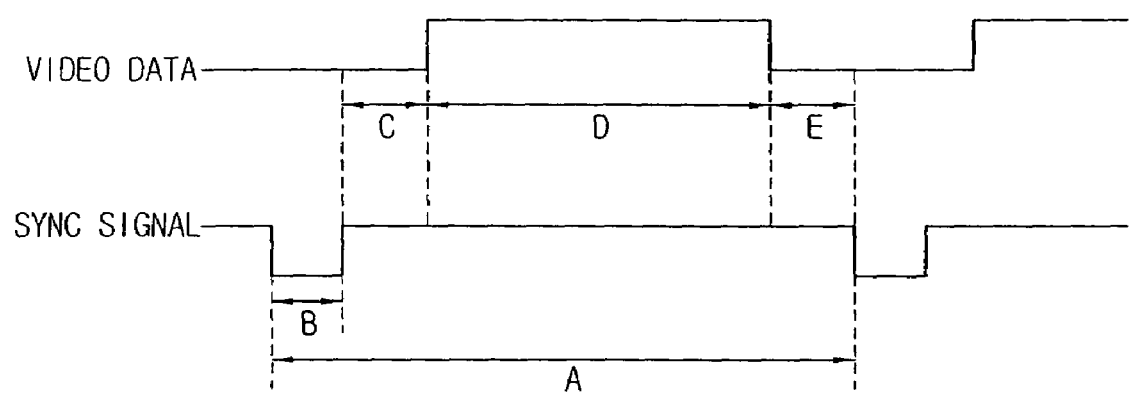
FIG. 3 is a timing view of a video signal.

To help better understanding of the aspects of the sync signal shown in Table 1, FIG. 3 illustrates a timing of a video signal.

As shown therein, Range A shows a scan line time/total frame time on one occasion, and Range B shows an amplitude of H sync and V sync signals. Range C, as a back porch, shows a delay time from a beginning of the sync signal to a first pixel/line of an active video range, Range D shows an active video time that actually displays the video, and Range E, as a front porch, shows a delay time from a last pixel/line of the active video range to a next sync signal.

The sync signal converter 50 is preferably implemented via a Complex Programmable Logic Device (CPLD) programmed to convert a sync signal in the EIA/CEA 861B standard from the signal processor 16 into the VESA standard.

The video signal output from the signal processor 16 is specified to a resolution of 480p, 720p, and 1080i. For each of the specified video signals, the sync signal converter 50 is provided to output the sync signal according to either the EIA/CEA 861B standard or the VESA standard.

Based on the Table 1, programming codes of the sync signal converter 50 to convert a sync signal with resolution of 480p, 720p, and 1080i in the ELA/CEA 861B standard into the VESA standard respectively.

TABLE 2

```
process(clk, nreset)
begin
    if nreset='0' then -- initial reset
        cnt<="000000000000";
        cnt_v<="0000";
        Hsync_out<='0';
        Vsync_out<='0';
    elsif clk'event and clk='1' then
        if H_strob='1' then -- H_strob becomes '1' only when H_sync is high.
            cnt<="000000000000";
        else
            cnt<=cnt+'1'; -- counting by Pixel clock
        end if;
        if Vsync_in='1' then -- 480p only
            if H_strob='1' and (cnt_v<"1111") then --when Vsync is '1', the number of H_sync is counted to cnt_v.
                cnt_v<=cnt_v+1;
            else
                cnt_v<=cnt_v;
            end if;
        else
            cnt_v<="0000";
        end if;
        if sel0='1' then -- 480p only
            Hsync_out<=Hsync_in; -- H_sync is the same in VESA standard EIA/CEA 861B standard.
            if cnt_v<"011" and cnt_v>"001" then -- VESA standard of V_sync has two lines. Adjust V FP, V BP
                Vsync_out<='0';
            else
                Vsync_out<='1';
            end if;
        else
            Vsync_out<=not Vsync_in; -- Only polarity of 720p and 1080i V_sync are changed in the VESA standard and the EIA/CEA 861B standard.
            if sel1='1' then -- 720p only
                if (cnt>"011001001010") --then H_sync in the VESA standard is fast about 40CLK, therefore delayed about 1620CLK.
                    Hsync_out<='0'; -- H Sync polarity is changed.
```

TABLE 2-continued

```
            else
                Hsync_out<='1';
            end if;
        else -- 1080i only
                                    if (cnt>"100001101100") -- H_sync
in the VESA standard is fast about 44CLK, therefore delayed about 2156CLK.
                Hsync_out<='0'; --H Sync polarity is changed.
            else
                Hsync_out<='1';
            end if;
        end if;
    end if;
 end if
end process;
```

Figure 4:
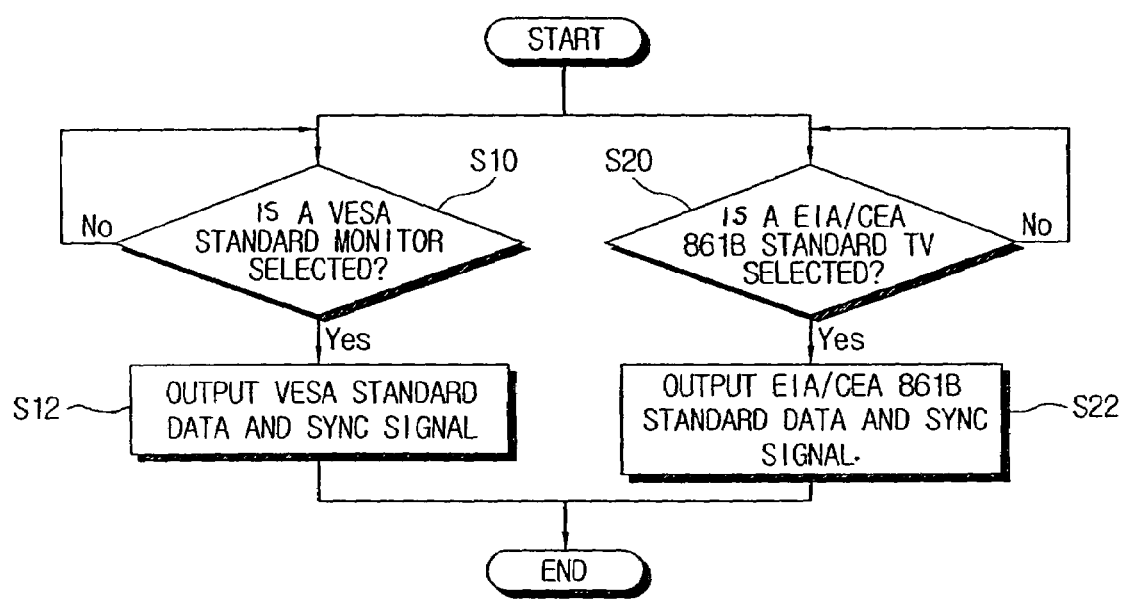
FIG. 4 is a flowchart of converting a sync signal of the display system according to the embodiment of the present invention.

According to the above configuration, a method of converting a sync signal of the display system according to an embodiment of the present invention can be described as follows referring to the flow chart in FIG. 4.

If the selector 40 selects the monitor in the VESA standard at operation S10, the sync signal converter 50 converts the sync signal in EIA/CEA standard output from the signal processor 16 into the VESA standard and outputs the converted signal through the RGB output part 18 and the DVI output part 20. Here, the video data from the RGB output part 18 and the DVI output part 20 and the sync signal in the VESA standard from the sync signal converter 50 are output, at operation S12.

On the other hand, if the selector 40 selects the television in the EIA/CEA standard at operation S20, the signal converter 50 bypasses the sync signal in the EIA/CEA standard from the signal processor 16 without conversion to the analog RGB output part 18 and the DVI output part 20. Thus, the video data and the sync signal in EIA/CEA standard are output through the display apparatus 30a and 30b, at operation S22.

Although the foregoing embodiment described that the signal processor 16 of the video signal supplier 10 outputs a video signal in EIA/CEA 861B standard, it can also output a video signal in VESA standard.

In this case, the sync signal converter 50 bypasses the sync signal in the VESA standard, or converts the sync signal in the VESA standard into the ELI/CEA 861 standard depending on a selection of the selector 40.

Additionally, both the analog RGB output part 18 and the DVI output part 20 are equipped according to the foregoing embodiment, but the foregoing embodiment of the present invention is also achieved by equipping one of the analog RGB output part 18 and the DVI output part 20:

In this way, the present invention allows the video signals in the EIA/CEA standard and the VESA standard to be alternatively output depending on the selection of the user, and thereby improving a compatibility of the display apparatus by supporting a different signal standard.

Although an embodiment of the present invention has been shown and described, it will be appreciated by those skilled in the art that changes may be made in the embodiments without departing from the principles and spirit of the invention, the scope of which is defined in the appended claims and their equivalents.

What is claimed is:

1. A display system comprising:
 a video signal supplier supplying a video signal;
 a display apparatus supporting one of a first video signal standard comprising a first sync signal format and a second video signal standard comprising a second sync signal format, and receiving the video signal from the video signal supplier, wherein the first sync signal format is at least partially different than the second sync signal format;
 a sync signal converter receiving a sync signal of the input video signal from the video signal supplier, converting the sync signal into the first sync signal format of the first video signal standard or the second sync signal format of the second video signal standard, based on which one of the first and second video signal standards is supported by the display apparatus, and providing a converted sync signal the video signal supplier to output to the display apparatus; and
 a selector selecting the first video signal standard if the first video signal standard is supported by the display apparatus and selecting the second video signal standard if the second video signal standard is supported by the display apparatus, wherein the sync signal converter converts the sync signal into the first sync signal format of the first video signal standard or the second sync signal format of the second video signal standard according to a selection of the selector,
 wherein the selector is connected to the sync signal converter such that the sync signal converter receives a selection from the selector as an input to initiate the conversion performed by the sync signal converter.

2. The display system according to claim 1, wherein the first sync signal format of the first video signal standard and the second sync signal format of the second video signal standard are different in at least one of polarity of a V (Vertical) sync signal and a H (Horizontal) sync signal; a number of V sync signal lines; a number of front porch lines and back porch lines of the V sync signal; and a number of front porch pixels and back porch pixels of the H sync signal.

3. The display system according to claim 1, wherein the first video signal standard corresponds to the VESA standard and, and the second video signal standard corresponds to the EIA/CEA 861B standard.

4. The display system according to claim 1, wherein the first sync signal format of the first video signal standard and the second sync signal format of the second video signal standard are alternatively output from the video signal supplier based on which one of the first and second video signal standards is supported by the display apparatus.

5. The display system according to claim 4, wherein the video signal supplier, the selector and the sync signal converter are provided in an external device, which is configured to be releasably connected to the display apparatus.

6. The display system according to claim 1, wherein the sync signal converter alternatively converts the sync signal supplied from the video signal supplier into two sync signals formats, the first sync signal format of the first video signal standard or the second sync signal format of the second video signal standard.

7. The display system according to claim 6, wherein the sync signal converter converts the sync signal supplied from the video signal supplier according to changes in video signal standards supported by the display apparatus.

8. The display system according to claim 1, wherein the selector alternatively selects a video signal of one of the first video signal standard and the second video signal standard, to be output according to a selection of a user.

9. The display system according to claim 8, wherein the video signal supplier, the selector and the sync signal converter are provided in an external device, which is configured to be releasably connected to the display apparatus.

10. The display system according to claim 1, wherein said selector is directly connected to said sync signal converter.

11. The display system according to claim 1, wherein the selector selects one of a first display device which supports the first video signal standard and a second display device which supports the second video signal standard, and the sync signal converter converts the sync signal according to the selection of the first and second display devices by the selector.

12. A method of converting a sync signal of a display system comprising a video signal supplier supplying a video signal, and a display apparatus supporting one of a first video signal standard comprising a first sync signal format and a second video signal standard comprising a second sync signal format, and outputting the video signal from the video signal supplier, wherein the first sync signal format is at least partially different than the second sync signal format, the method comprising:

selecting one of the first video signal standard and the second video signal standard which based on which one of the first and second video signal standards is supported by the display apparatus; and converting a sync signal of the input video signal into the first sync signal format or the second sync signal format if a selected one of the first video signal standard and the second video signal standard does not correspond to a video standard of the input video signal, and providing a converted sync signal the video signal supplier to output to the selected display apparatus, wherein the step of selecting includes selecting one of a first display device which supports the first sync signal format and a second display device which supports the second sync signal format.

13. The method of converting a sync signal of a display system according to claim 12, wherein the first sync signal format and the second sync signal format are different in at least one of polarity of a V sync signal and a H sync signal; a number of V sync signal lines; a number of front porch lines and back porch lines of the V sync signal; and a number of front porch pixels and back porch pixels of the H sync signal.

14. The method of converting a sync signal of a display system according to claim 12, wherein the first video signal standard comprises the VESA standard, and the second video signal standard comprises the EIA/CEA 861B standard.

15. The method of converting a sync signal of a display system according to claim 13, wherein the first video signal standard comprises the VESA standard, and the second video signal standard comprises the EIA/CEA 861B standard.

16. The method of converting a sync signal of a display system according to claim 12, wherein the first sync signal format of the first video signal standard and the second sync signal format of the second video signal standard are alternatively output from the video signal supplier based on which one of the first and second video signal standards is supported by the display apparatus.

17. The method of converting a sync signal of a display system according to claim 12, the method further comprising, determining which sync signal format of the first and second sync signal formats is supported by a selected display device.

18. A display system comprising:

a video signal supplier receiving and decoding an encoded broadcast signal, and outputting a video signal;

a display apparatus supporting one of a first video signal standard comprising a first sync signal format and a second video signal standard comprising a second sync signal format, and receiving the video signal from the video signal supplier, wherein the first sync signal format is at least partially different than the second sync signal format;

a selector selecting one of the first video signal standard and the second video signal standard based on which one of the first and second video signal standards is supported by the display apparatus; and a sync signal converter receiving a sync signal of a decoded broadcast signal from the video signal supplier, converting a format of the sync signal to the first sync signal format or the second sync signal format according to an output signal of the selector, and providing a converted sync signal the video signal supplier to output the selected display apparatus, wherein the converter does not convert the format of the sync signal when the display apparatus supports a video standard corresponding to the decoded broadcast signal, wherein the selector is connected to the sync signal converter such that the sync signal converter receives a selection from the selector as an input to initiate the conversion performed by the sync signal converter.

19. The display system according to claim 18, wherein the first sync signal format of the first video signal standard and the second sync signal format of the second video signal standard are different in at least one of polarity of a V (Vertical) sync signal and a H (Horizontal) sync signal; a number of V sync signal lines; a number of front porch lines and back porch lines of the V sync signal; and a number of front porch pixels and back porch pixels of the H sync signal.

20. The display system according to claim 18, wherein the first video signal standard corresponds to the VESA standard and, and the second video signal standard corresponds to the EIA/CEA 861B standard.

21. The display system according to claim 18, wherein the first sync signal format of the first video signal standard and the second sync signal format of the second video signal standard are alternatively output from the video signal supplier based on which one of the first and second video signal standards is supported by the display apparatus 22. The display system according to claim 21, wherein the video signal supplier, the selector and the sync signal converter are provided in an external device, which is configured to be releasably connected to the display apparatus.

* * * * *